US006995992B2

(12) United States Patent
Wei et al.

(10) Patent No.: US 6,995,992 B2
(45) Date of Patent: Feb. 7, 2006

(54) DUAL BRIDGE MATRIX CONVERTER

(75) Inventors: Lixiang Wei, Whitefish Bay, WI (US); Thomas A. Lipo, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 215 days.

(21) Appl. No.: 10/601,061

(22) Filed: Jun. 20, 2003

(65) Prior Publication Data

US 2005/0099829 A1    May 12, 2005

(51) Int. Cl.
 *H02M 5/40* (2006.01)
 *H02M 1/14* (2006.01)
(52) U.S. Cl. .......................................... 363/34; 363/39
(58) Field of Classification Search .................. 363/34, 363/37, 39, 40, 47, 48
 See application file for complete search history.

(56) References Cited

U.S. PATENT DOCUMENTS

| 4,628,425 | A | | 12/1986 | Venturini et al. | |
| 4,864,483 | A | * | 9/1989 | Divan | 363/37 |
| 6,185,115 | B1 | * | 2/2001 | Sul et al. | 363/37 |
| 6,330,170 | B1 | * | 12/2001 | Wang et al. | 363/37 |
| 6,762,947 | B2 | * | 7/2004 | Hammond | 363/35 |
| 6,850,424 | B2 | * | 2/2005 | Baudelot et al. | 363/37 |
| 6,856,038 | B2 | * | 2/2005 | Rebsdorf et al. | 290/44 |
| 2004/0136210 | A1 | * | 7/2004 | Oh | 363/37 |

FOREIGN PATENT DOCUMENTS

EP  1 280 263 A2  1/2003
EP  1 289 112 A2  3/2003

OTHER PUBLICATIONS

M. Baumann, et al., "Part II: Experimental Analysis of the Very Sparse Matrix Converter," Applied Power Electronics Conference and Exposition, 2002, APEC 2002, Seventeenth Annual IEEE, vol. 2, Mar. 10-14, 2002, pp. 788-791.
Marco Venturini, Alberto. Alesina, "The Generalized Transformer: A New Bidirectional Sinusoidal Waveform Frequency Converter with Continuously Adjustable Input Power Factor," IEEE Power Electronics Specialists Conference Record 1980, Atlanta, GA, Jun., 1980, pp. 242-252.
Lixiang Wei, T.A. Lipo, Ho Chan, "Matrix Converter Topologies with Reduced Number of Switches," Proceedings of IEEE Power Electronics Specialists Conference, PESC '02, Jun. 23-27, 2002, pp. 57-63.

(Continued)

*Primary Examiner*—Adolf Berhane
(74) *Attorney, Agent, or Firm*—Foley & Lardner LLP

(57) ABSTRACT

A dual bridge matrix converter has a line-side converter with controllable switches that receives AC power and provides unidirectional power to high and low DC link lines, and a load-side converter which receives the power from the DC link lines and provides AC power to output lines. A clamp circuit is connected across the DC link lines and includes a series connected diode and a capacitor. Negative DC link current will be conducted through the clamp diode to charge the clamp capacitor to avoid voltage spikes on the DC link lines. A controllable switch may be connected in parallel with the clamp diode and is turned on when the voltage across the clamp capacitor is above a threshold that is greater than the normal peak-to-peak AC input voltage. The switch is turned off when the voltage across the clamp capacitor is lower than the threshold voltage.

11 Claims, 11 Drawing Sheets

OTHER PUBLICATIONS

L. Wei, et al., "A Novel Matrix Converter Topology with Simple Commutation," Proceedings of 36th IEEE Industry Applications Society Conference (IAS '2001), Chicago, Illinois, USA, 2001, vol. 3, pp. 1749-1754.

J.W. Kolar, et al., "Novel Three-Phase AC-DC-AC Sparse Matrix Converter," Proceedings of 17th IEEE Applied Power Electronics Conference and Exposition, APEC 2002, vol. 2, 2002, pp. 777-791.

M. Baumann, et al., "Part II: Experimental Analysis of the Very Sparse Matrix Converter," 2002, pp. 788-791.

* cited by examiner

DUAL BRIDGE MATRIX CONVERTER

REFERENCE TO GOVERNMENT RIGHTS

This invention was made with United States government support awarded by the following agency: NSF 9731677. The United States government has certain rights in this invention.

FIELD OF THE INVENTION

This invention pertains generally to AC to AC electrical power converters and particularly to dual bridge matrix converters.

BACKGROUND OF THE INVENTION

A variety of circuit topologies have been developed using solid-state switches for conversion of AC power at one frequency to AC power at another frequency. Among the many circuit designs are conventional AC to DC to AC converters, in which the AC power is rectified to a DC voltage applied across DC bus lines and the DC voltage is then converted to AC by an inverter, and matrix converters, in which the input AC power is not rectified but is directly converted using a matrix of bidirectional switching elements (conventionally formed of pairs of transistors). The main advantages of matrix converters are adjustable power factor (including unity), bi-directional power flow, high quality power output waveforms, and the possibility of a more compact product because a large energy storage component (such as a DC bus capacitor) is not needed. However, the matrix converter has not been widely adopted. One reason is that the conventional modulation algorithm for such converters requires an involved and difficult pulse width modulation (PWM) switching strategy. A complicated commutation scheme and an elaborate multi-diode clamp circuit typically must be used for safe operation. See P. Nielsen, et al., "New Protection Issues of the Matrix Converter: Design Considerations for Adjustable Speed Drives," IEEE Trans. on Industry Applications, Vol. 35, No. 5, 1999, pp. 1150–1161.

A relatively new converter topology is the dual bridge matrix converter. See, L. Wei, et al., "A Novel Matrix Converter with Simple Commutation," Proceedings of 36th IEEE Industry Applications Society Conference (IAS '2001), Chicago, Ill., USA, 2001, Vol. 3, pp. 1749–1754. The reason this topology is also referred to as a matrix converter is that it shows the same input/output performance as conventional matrix converters, and can also be described by switching matrices similar to the conventional matrix converter. The dual bridge matrix converter also has many of the advantages of the conventional matrix converter, including near sinusoidal input/output waveforms, adjustable input power factor, and a compact physical package because no large energy storage components are required. The dual bridge matrix converter has several advantages over the conventional matrix converter, including reduced difficulty of commutation since all line-side switches turn on and off at zero current and all load-side switches commutate similarly to a conventional DC/AC inverter, and the number of switches required can be reduced under certain constraints. A nine-switch dual bridge matrix converter has been developed that has the least number of switches while still providing high quality input and output waveforms. Three switches are utilized on the input side and six switches are utilized on the output side for three-phase operation. However, a disadvantage of this converter configuration is that its DC link current must be non-negative to guarantee safe operation. If the DC link current becomes negative, some high voltage spikes can be generated because there are no reverse current paths in the line-side converter, and the converter may be damaged by these spikes. It has been suggested that the output power factor should always be higher than 0.866 to guarantee safe operation of the converter. See J. W. Kolar, et al., "Novel Three-Phase AC/DC/AC Sparse Matrix Converter," Proceedings of 17th IEEE Applied Power Electronics Conference and Exposition, APEC 2002, Vol. 2, 2002, pp. 777–791, and L. Wei, et al., "Matrix Converter with Reduced Number of Switches," Proceedings of IEEE Power Electronics Specialists Conference, PESC '02, 2002, pp. 57–63.

SUMMARY OF THE INVENTION

In accordance with the invention, a dual bridge matrix converter has an input (line-side) converter with controllable switches that receives AC power and provides unidirectional power to high and low DC link lines, and a full bridge output (load-side) converter which receives the power from the DC link lines and provides AC power to output lines. For three-phase operation, the input converter preferably has three switches, each of which is connected by two diodes to one of the input lines and by diodes to the DC link lines, and the output converter has six switches, a pair for each phase leg, which are controlled to provide PWM output waveforms on output lines connected to junctions between each of the pairs of switches. A DC link clamp having a series connected diode and capacitor is connected across the DC link lines. Any negative DC link current flows into the clamp capacitor through the clamp diode for a short period of time to reduce or eliminate high voltage spikes. Because the clamp capacitor is not required to store large amounts of energy to supply the output inverter (as is required in conventional AC to DC to AC converters), the clamp capacitor can be relatively small, inexpensive, and low rated. The DC link clamp may also include an additional switch connected in parallel with the clamp diode to allow exchange of power between the clamp capacitor and the output converter, allowing operation under low power factor conditions.

In operation of the invention utilizing a clamp switch in parallel with the clamp diode, when the converter is first started, all of the switches on the line-side converter turn on initially and the clamp capacitor voltage is charged up to the maximum peak-to-peak line voltage. Upon occurrence of a fault state, all switches in the converter are turned off immediately, and the energy stored in an inductive load will flow into the clamp capacitor to avoid high voltage spikes. During normal operation, if the clamp capacitor voltage is above a threshold voltage that is higher than the peak-to-peak input voltage, the clamp switch is turned on. Under these conditions, the line-side converter is anti-biased because the clamp capacitor voltage is higher than the maximum amplitude of the input line voltage. In this condition, the voltage of the clamp capacitor begins to reduce because it provides power to the load. During normal operations, if the clamp voltage is lower than the threshold voltage, the clamp switch is turned off and the line-side converter switches operate normally to supply power to the DC link.

Further objects, features and advantages of the invention will be apparent from the following detailed description when taken in conjunction with the accompanying drawings.

BRIEF DESCRIPTION OF THE DRAWINGS

In the drawings:

FIG. 7 is a schematic circuit diagram of the equivalent circuit of the converter of the invention when the clamp switch is turned on.

DETAILED DESCRIPTION OF THE INVENTION

Figure 1:
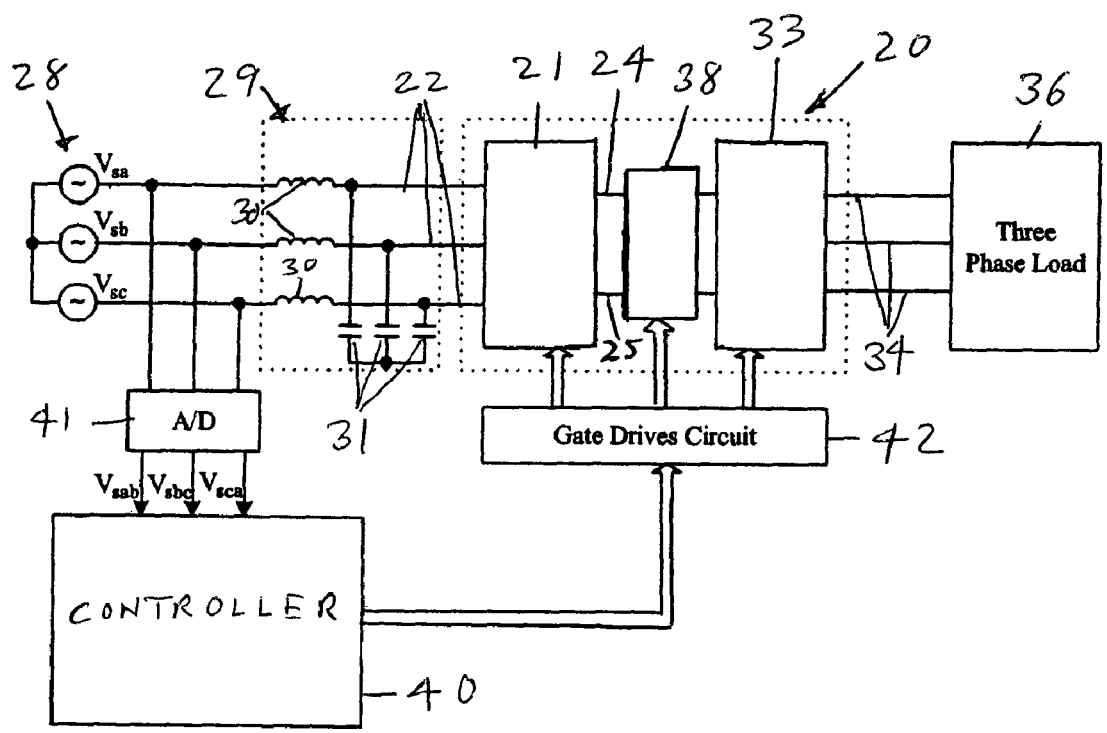
FIG. 1 is a block diagram of the dual bridge matrix converter of the invention.

With reference to the drawings, a dual bridge matrix converter with a DC link clamp in accordance with the invention is shown in schematic form generally at 20 in FIG. 1. The converter 20 includes an input or line-side converter 21 which receives AC input power on input lines 22 (three-phase lines shown for illustration). The line-side converter is connected across and provides unidirectional power to a DC link composed of a high DC link line 24 and a low DC link line 25. The line-side converter 21 may be any of various circuit topologies which may be used without a DC link energy storage capacitor, for example, 18, 15, 12 and 9 switch topologies. The AC power from an AC power system 28 is preferably filtered by an input filter 29 which may be comprised of series inductors 30 and parallel connected capacitors 31. The dual bridge matrix converter 20 also includes an output or load-side converter 33 which is connected across the DC link lines 24 and 25 to receive power therefrom, and which supplies output power on output lines 34 to a load 36, which typically may be various types of AC motors such as permanent magnet motors, induction motors, etc. In accordance with the invention, a clamp circuit 38 is connected between the DC link lines 24 and 25 to suppress transient voltage spikes across the DC link lines, as discussed further below. Control of the converter 20 is carried out utilizing a digital controller 40 which receives input signals from an analog-to-digital converter 41. The A to D converter 41 is connected to the power lines from the power system 28 and provides digital output data to the controller 40 indicative of the voltage across the power lines and may also be connected to the clamp circuit 38 to provide data indicative of clamp capacitor voltage as discussed further below. The controller 40, which may be, for example, any of various standard digital signal processing (DSP) microprocessor-based controllers, processes the input data and provides PWM control logic to control the switches in the line-side converter 21 and in the load-side converter 33. Output signals from the controller 40 are provided to a gate drive circuit 42 which provides the gate drive signals to the line-side converter 21 and the load-side converter 33. As discussed further below, where an active clamp circuit 38 is utilized in accordance with the invention, the controller 40 also provides output signals to the gate drive circuit 42 to provide a gate drive signal to the clamp 38.

Figure 2:
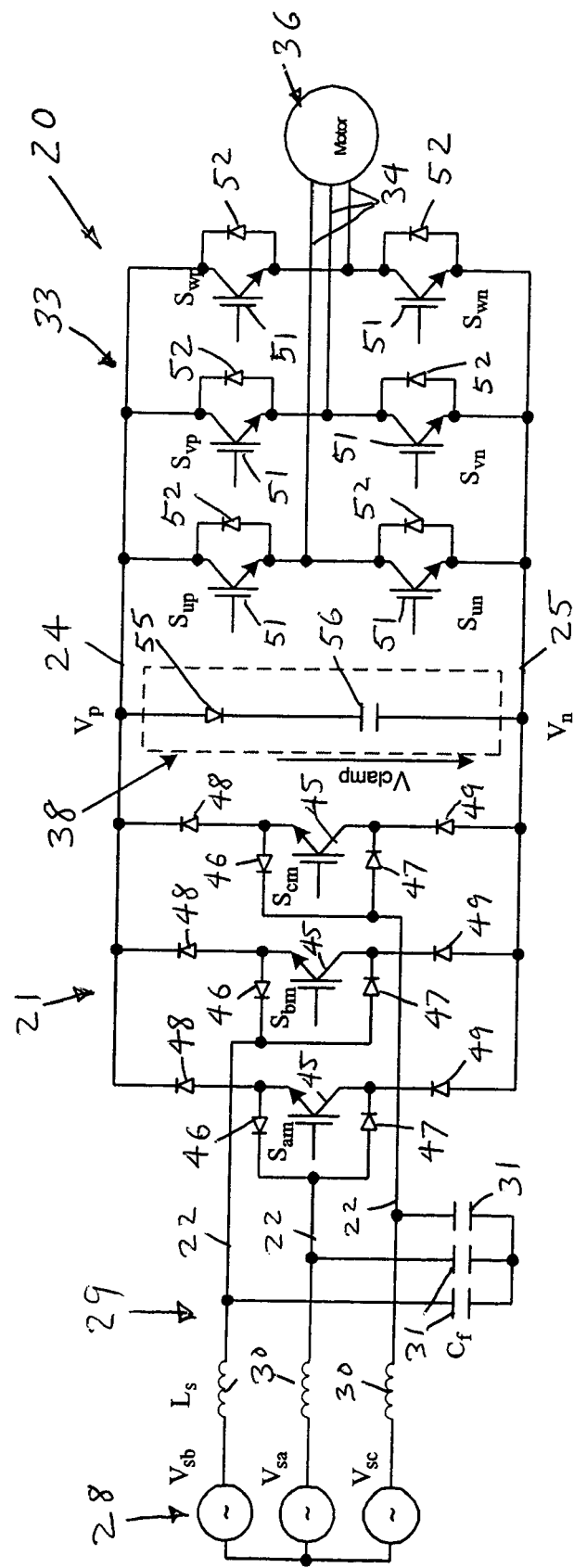
FIG. 2 is a schematic circuit diagram of a dual bridge matrix converter with a DC link clamp in accordance with the invention.

With reference to FIG. 2, a preferred line-side converter configuration as illustrated therein includes three gate controlled semiconductor switches 45 which may be, for example, IGBTs, each of which is connected from each side of the switch 45 by anti-parallel oriented diodes 46 and 47 to one of the input lines 22. As used herein, gate controlled switches may be any of the various types of electronic switches that switch in response to a control signal. The switches 45 are connected to the DC link lines 24 and 25 by series connected diodes 48 and 49, respectively, so that current can flow from the switches 45 through the diodes 48 to the DC link high line 24 and from the DC link low line 25 through the diodes 49 to the switches 45, but with current prevented from flowing in the opposite direction. For purposes of the analysis of the operation of the converter as discussed further below, the three switches 45 will be designated separately as switch $S_{am}$, switch $S_{bm}$, and switch $S_{cm}$.

The load-side converter 33 is preferably a full bridge converter, as illustrated in FIG. 2, having gate controlled semiconductor switches 51 that are connected in pairs across the DC link lines 24 and 25, with the junction between each pair of switches being connected to one of the output lines 34. The switches 51 may be various power semiconductor switching devices, such as IGBTs with parallel free wheeling diodes 52 as shown in FIG. 2. The three-switch line-side converter 21 and the six-switch load-side converter 33 shown in FIG. 2 provide a dual bridge matrix converter configuration with the least number of switches while still having the capability of providing high quality output waveforms.

In accordance with the invention, the clamp circuit 38 is connected across the DC link lines 24 and 25 to suppress voltage spikes as a result of back current flow from the load-side converter 33 toward the line-side converter 21, which is blocked from flowing through the line-side converter 21 by the diodes 48 and 49. The clamp circuit 38 includes a series connected diode 55 and a capacitor 56, with the diode 55 arranged to conduct current from the DC link high line 24 through the capacitor 56 to the DC link low line 25. In contrast to clamp circuits for conventional matrix converters, which generally require a full bridge composed of several diodes, only one diode is required for the clamp 38, a considerable savings in cost and simplicity of circuitry. Because the clamp capacitor 56 is not required to store energy for operation of the converter, it may be relatively small, inexpensive, and low rated as compared with the large and potentially failure prone electrolytic capacitors typically required for the DC link capacitors of conventional AC to DC to AC converters.

Figure 3:
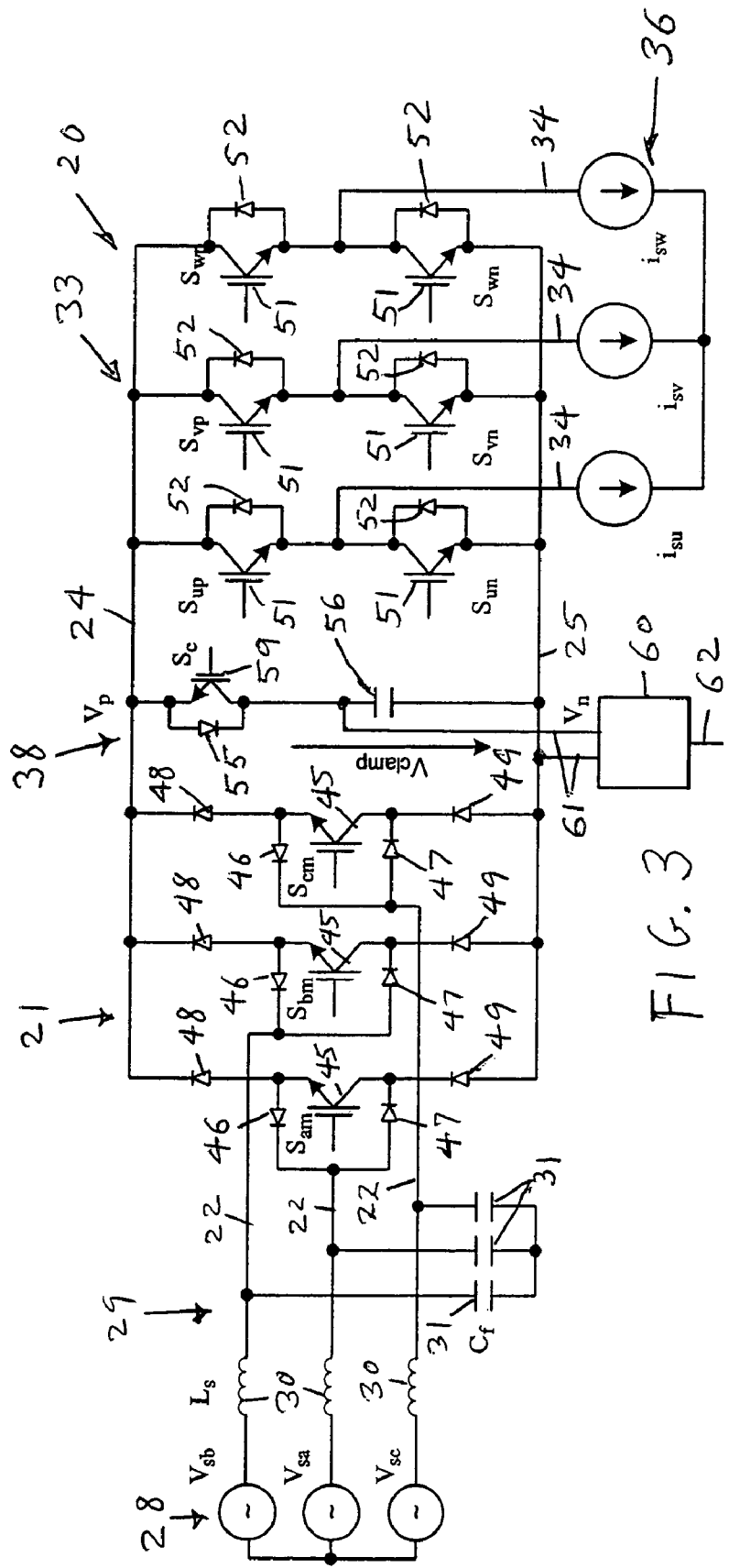
FIG. 3 is a schematic circuit diagram of a dual bridge matrix converter with a DC link clamp circuit having a clamp switch in accordance with the invention.

Under certain conditions, particularly with low output power factor, current may flow for a sustained period of time from the load-side converter 33 on the DC link lines toward the line-side converter 21. This current is diverted through the clamp diode 55 to the clamp capacitor 56, which continuously charges as long as current is flowing through the diode 55. As shown in FIG. 3, the clamp circuit 38 in accordance with the invention may include an active gate controlled switch 59 connected in parallel with the clamp diode 55 which, when turned on, conducts in a direction anti-parallel to the diode 55. The switch 59 may be, for example, an IGBT. The gate control signal for the switch 59 is also provided from the controller 40 through the gate drive circuits 42. A voltage sensor circuit 60 is connected by lines 61 to receive the voltage across the clamp capacitor 56 and provides a signal on an output 62 to the controller 40 (e.g., via the A/D converter 41) to allow monitoring of the clamp capacitor voltage. If desired, the voltage across the DC link lines 24 and 25 can also be monitored. Control of the switching of the switch 59 allows selective transfer of energy between the capacitor 56 and the DC link lines, as explained further below. If desired, a resistor (not shown) of relatively high resistance (e.g., 100 K ohms to 1 M ohms) may be connected in parallel with the clamp capacitor 56 to gradually discharge it, particularly when the converter is turned off.

Figure 4:
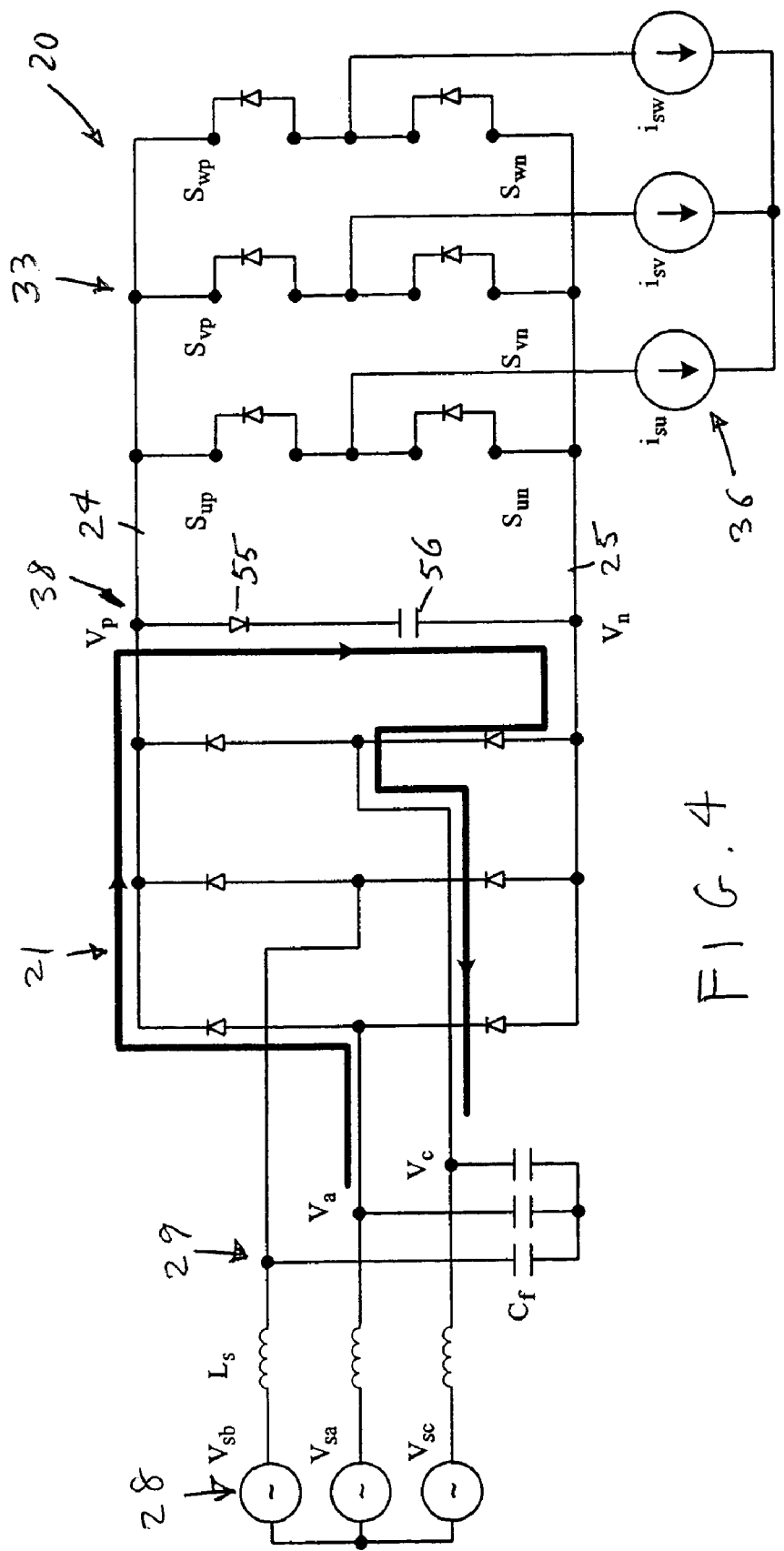
FIG. 4 is a schematic circuit diagram of the equivalent circuit of the converter of the invention during system start-up, showing the current flow path when the input line voltage $V_a$ is greater than the line voltage $V_b$, which in turn is greater than the line voltage $V_c$.

FIGS. 4–8 are equivalent circuits showing the elements of the dual bridge matrix converter 20 of the invention that are active under various conditions. FIG. 4 illustrates the effective circuit elements and the input current flow during system start-up when the voltage $V_a$ is greater than the voltage $V_b$, which is in turn greater than the voltage $V_c$. In this condition, all line-side switches turn on and the load-side switches turn off. The clamp switch 59 is turned off and the clamp circuit capacitor 56 is charged up to the maximum input peak-to-peak voltage.

Figure 5:
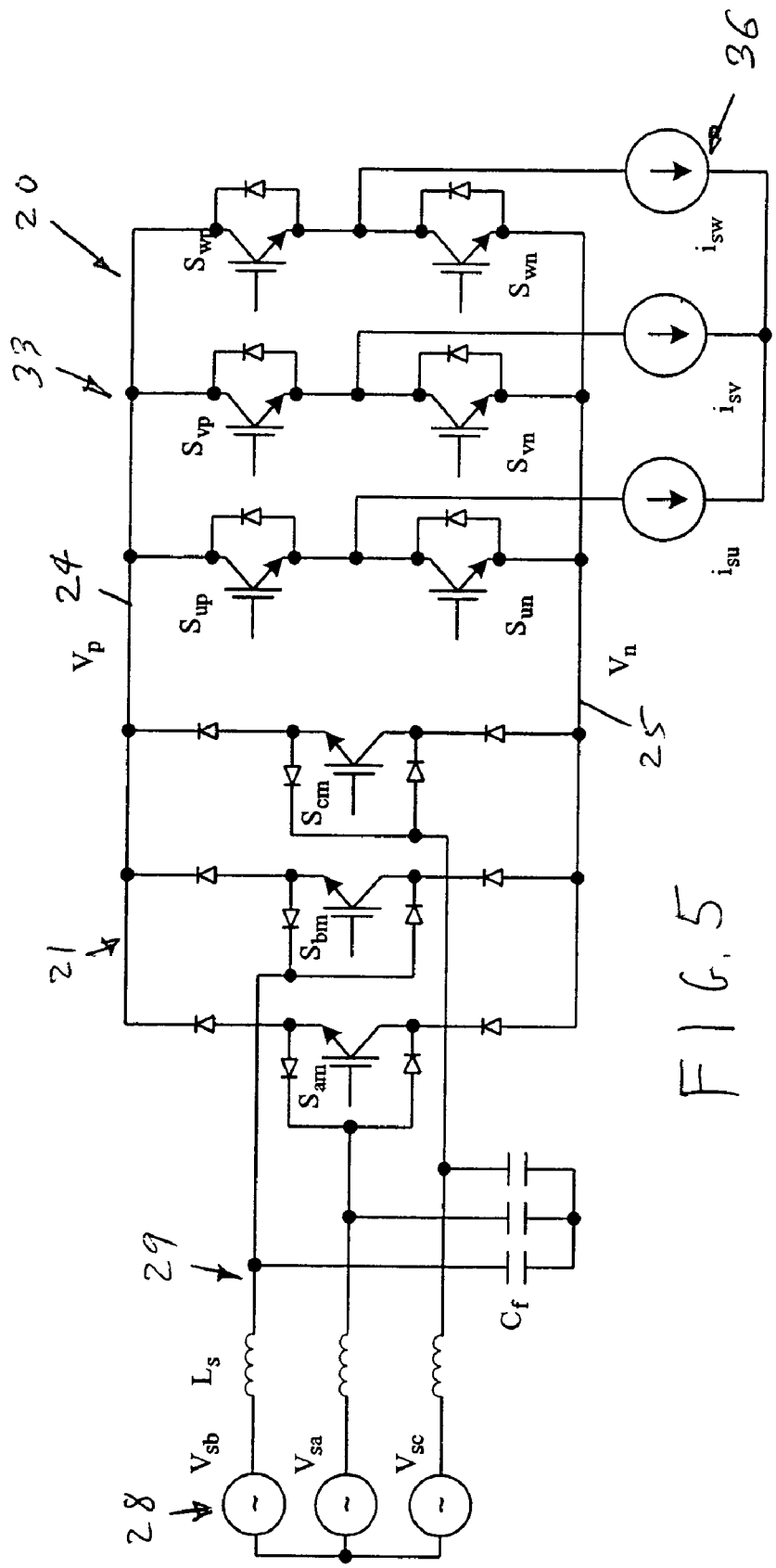
FIG. 5 is a schematic circuit diagram of the equivalent circuit of the converter of the invention at high output power factor.

FIG. 5 is an equivalent circuit for the converter 20 showing the active elements at high output power factor. Under these conditions, the clamp switch 59 is turned off and the voltage of the clamp capacitor is slightly higher than the normal voltage across the DC link lines 24 and 25, so that the clamp diode 55 is reverse biased.

Figure 6:
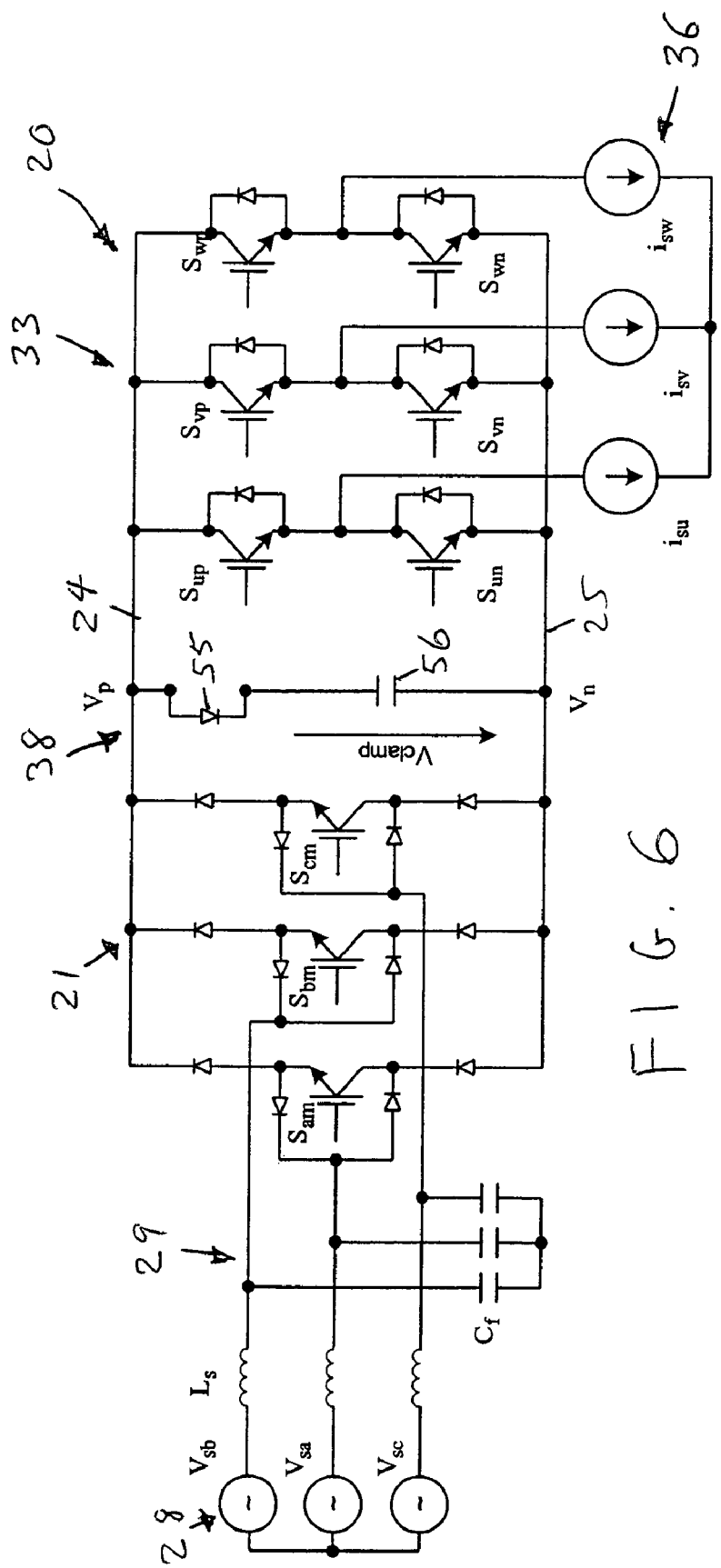
FIG. 6 is a schematic circuit diagram of the equivalent circuit of the converter of the invention when the clamp switch is turned off.

FIG. 6 is an equivalent circuit of the active circuit elements of the converter 20 when the clamp switch 59 turns off. The line-side converter 21 supplies the power for the positive DC link current. The clamp circuit capacitor 56 stores the energy from the negative DC link current. Under such conditions, the clamp capacitor can only be charged since the switch 59 is turned off.

Figure 7:
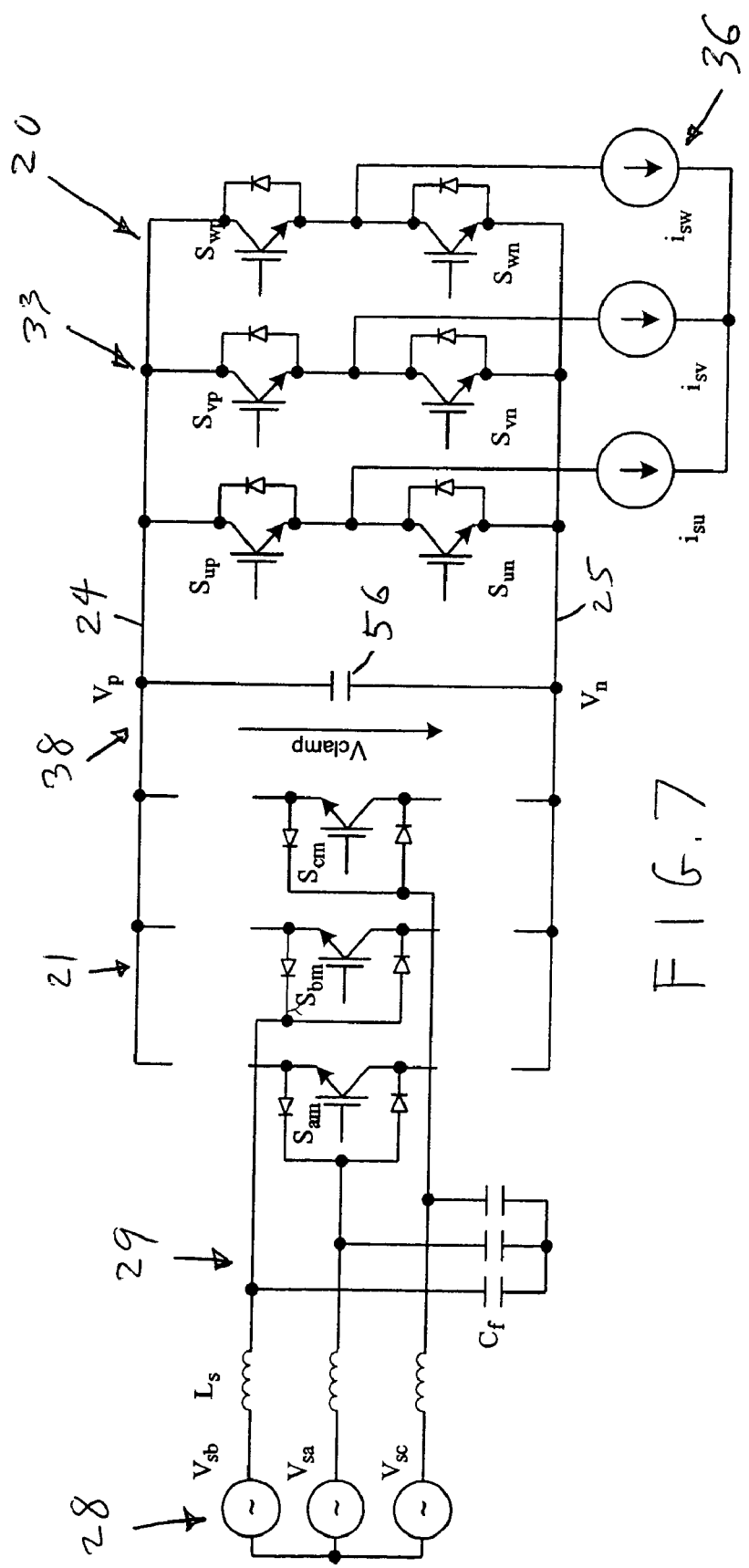

FIG. 7 illustrates the effective equivalent circuit for the converter 20 when the switch 59 turns on. If the voltage across the clamp capacitor 56 is higher than a selected threshold voltage (a voltage level that is selected to be somewhat higher than the normal peak-to-peak input voltage), then the clamp switch 59 is turned on to discharge the capacitor by conducting current through the switch 59 to the DC link lines 24 and 25 and to the load-side converter 33. For example, if the normal line-to-line source voltage is 230 V rms, the threshold voltage may be selected to be 230×$\sqrt{2}$=325 plus a small additional voltage value (e.g., 20 to 30 V).

Figure 8:
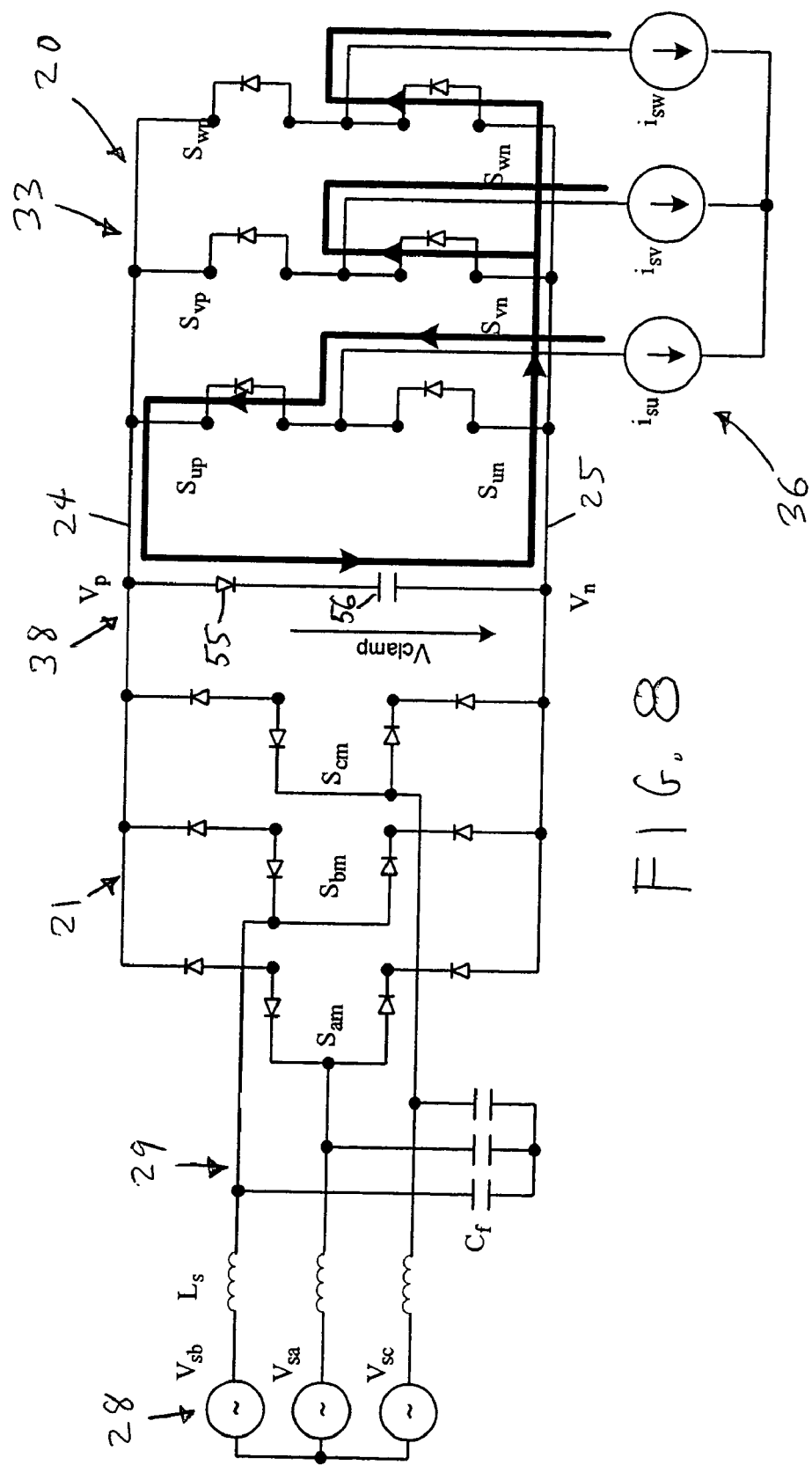
FIG. 8 is a circuit diagram of an equivalent circuit of the converter of the invention during shut-down or a fault state, illustrating the reverse current flow paths.

FIG. 8 shows an equivalent circuit of the converter 20 during shutdown of the system or during a fault. Under these conditions, all of the active switches are turned off. The energy of the leakage inductance in the load-side flows back through the clamp diode 55 to charge up the clamp capacitor 56, thus avoiding voltage spikes.

The following describes a space vector PWM control that can be carried out by the controller 40 under normal conditions with high output power factor, and further describes the effect of the clamp circuit 38 on the converter control under low output power factor conditions.

Under normal conditions for the converter of FIG. 2 or 3 the DC link current is greater than or equal to zero. The space vector PWM control scheme discussed below is applicable to such 9-switch converters when the DC link current is nonnegative.

In order to simplify the analysis, it is assumed that there is no input filter on the line side. Referring to the notation used in FIGS. 2 and 3:

$$L_f=0;\ C_f=0;\ V_{sx}=V_x;\ i_{sx}=i_x;\ x=a,\ b,\ c$$

It is assumed that the input source voltages are described by $$\begin{cases} V_{sa} = V_m \cos\theta_a = V_m \cos(\omega_i t) \\ V_{sb} = V_m \cos\theta_b = V_m \cos\left(\omega_i t - \frac{2\pi}{3}\right) \\ V_{sc} = V_m \cos\theta_c = V_m \cos\left(\omega_i t + \frac{2\pi}{3}\right) \end{cases} \quad (1)$$

and the output currents are $$\begin{cases} i_{su} = I_o \cos\theta_{oi} = I_o \cos(\theta_o - \varphi_o)_n \\ i_{sv} = I_o \cos\left(\theta_o - \varphi_o - \frac{2\pi}{3}\right) \\ i_{sw} = I_o \cos\left(\theta_o - \varphi_o + \frac{2\pi}{3}\right) \end{cases} \quad (2)$$

where $\omega_i$ and $\omega_o$ are the input and output angular frequencies, $\theta_O$ is the angle of the expected output voltage vector and $\phi_O$ is the output power factor angle. $V_m$ and $I_O$ are the amplitudes of input voltage and output current respectively.

Figure 9:
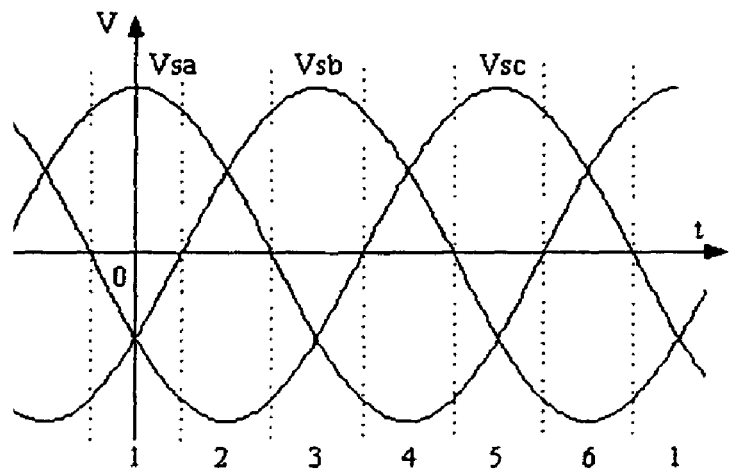
FIG. 9 is a diagram illustrating the six intervals of a switching cycle.

To help determine the conditions for safe commutation, six intervals of a switching cycle can be identified, based on detection of the input voltage synchronization angle as shown in FIG. 9. During each interval, only one of the three-phase input voltages has the largest absolute value. For example, $V_{sa}$ has the largest absolute voltage value in interval 1, $V_{sc}$ has the largest absolute voltage value in interval 2, and so forth.

Two portions are also identified in each switching cycle interval. In each portion, some appropriate switching behavior can be analyzed on different switches according to the number of intervals to replace the double bridge matrix converter topology as a DC/AC inverter.

For example, $V_{sc}$ in interval 2 has the largest absolute voltage, the two largest positive line voltages are $V_{sa}-V_{sc}$ and $V_{sb}-V_{sc}$, respectively. The line-side switching states in each portion can be determined by the following:

In portion 1, $S_{bm}$ and $S_{cm}$ remain turned on; $S_{am}$ remains turned off. The DC side voltage $V_{dc}$ is then equal to $V_{sb}-V_{sc}$, the DC side current $i_{dc}$ equals $i_{sb}$ and $-i_{sc}$, and $i_{sa}$ equals zero. The duty cycle of this portion is defined as $d_{bc}$.

In portion 2, $S_{am}$ and $S_{cm}$ remains turned on; $S_{bm}$ remains turned off. The DC side voltage $V_{dc}$ equals $V_{ab}-V_{sc}$, the DC side current $i_{dc}$ equals $i_{sa}$ and $-i_{sc}$, and $i_{sb}$ equals zero. The duty cycle of this portion is defined by $d_{ac}$.

In the two portions of interval 2, the converter can be considered as an equivalent DC/AC inverter with different DC voltages during each of the two portions.

Initially, it is useful to consider the conventional voltage source inverter with three-phase output voltage $V_{su}$, $V_{sv}$, and $V_{sw}$ supplied by a DC voltage source $V_{dc}=3V_m/2$. In complex form, the space vector of the desired output voltages is $$V_{o\_ref} = V_{su} + V_{sv} \cdot e^{j\frac{2\pi}{3}} + V_{sw} \cdot e^{-j\frac{2\pi}{3}} = k \cdot \frac{3V_m}{2} < \theta_o \qquad (3)$$

Where $0 < k < \overline{3}/2$ is a constant.

Figure 10:
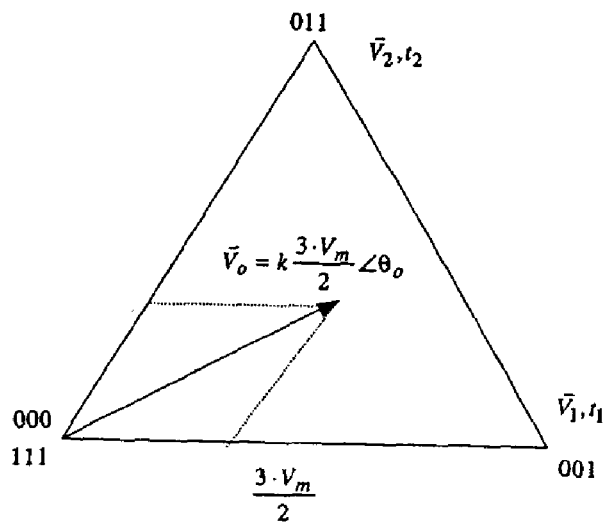
FIG. 10 is a diagram illustrating the calculation of the space vector PWM in interval two and wherein the output voltage vector angle is between 0 and 60 degrees.

Assuming $0 < \theta_0 < \pi/3$ and that the system operates in interval 2, this vector can be approximated by its two adjacent voltage vectors ($V_1$ and $V_2$) and the zero voltage vector $V_0$, as shown in FIG. 10. The duty ratios of these vectors are $$d_1 = \frac{2k}{\sqrt{3}}\sin\left(\frac{\pi}{3}-\theta_o\right); \qquad (4)$$

$$d_2 = \frac{2k}{\sqrt{3}}\sin(\theta_o);$$

$$d_o = 1 - d_1 - d_2$$

The DC current of the inverter as voltage vectors $V_0$, $V_1$ and $V_2$ can be expressed as 0, $i_{su}$, and $-i_{sw}$ respectively. The average DC current of the inverter with the above duty cycles is determined as $$i_{dc}=k \cdot I_0 \cdot \cos(\theta_0-\theta_{0i})=I_{im} \qquad (5)$$

Because there are two portions during each switching cycle, the duty cycles $V_1$, $V_2$, and $V_0$ are also distributed to each portion. During the first portion, they are:

$$d_{1bc}=d_1 \cdot |\cos\theta_b|; \ d_{2bc}=d_2 \cdot |\cos\theta_b|$$

$$d_{0bc}=d_0/2; \ d_{bc}=d_{1bc}+d_{2bc}+d_{0bc} \qquad (6)$$

During the second portion, $$d_{1ac}=d_1 \cdot |\cos\theta_a|; \ d_{2ac}=d_2 \cdot |\cos\theta_a|$$

$$d_{0ac}=d_0/2; \ d_{ac}=d_{1ac}+d_{2ac}+d_{0ac} \qquad (7)$$

Combining from Equations (3) to (7), the actual average output voltage vector and the input current can finally be obtained as $$\overline{V}_o = k \cdot \frac{3V_m}{2} < \theta_o; i_{sa} = I_{im} \cdot \cos\theta_a \qquad (8)$$

$$i_{sb} = I_{im} \cdot \cos\theta_b; i_{sc} = I_{im} \cdot \cos\theta_c$$

This result demonstrates that the space vector PWM control method generates the same actual output voltage as the reference voltage and that the line-side power factor can inherently remain at unity.

When the system operates during the other intervals or when $\theta_0 > \pi/3$, the same results can be obtained.

Since the DC side current equals to $i_{su}$ while the output voltage is $V_1$, then from equation (2)

$$i_{dc}=I_0 \cos(\theta_0-\phi_0) \geq 0 \qquad (9)$$

Thus we have $$-\frac{\pi}{2} \leq \theta_o - \varphi_o \leq \frac{\pi}{2} \qquad (10)$$

Because $0<\theta_0<\pi/3$, the following equations can be derived from (10)

$$-\frac{\pi}{6} \leq \varphi_o \leq \frac{\pi}{2} \qquad (11)$$

On the other hand, the DC side current equals to $-i_{sw}$ while the output voltage is $V_2$, then from equation (2)

$$i_{dc} = -I_o\cos\left(\theta_o - \varphi_o + \frac{2\pi}{3}\right) \geq 0 \qquad (12)$$

Thus we have $$\frac{\pi}{2} \leq \theta_o + \varphi_o + \frac{2\pi}{3} \leq \frac{3\pi}{2} \qquad (13)$$

Because $0<\theta_0<\pi/3$, the following equations can be derived from (13)

$$-\frac{\pi}{2} \leq \varphi_o \leq \frac{\pi}{6} \qquad (14)$$

Thus, to apply the space vector PWM control method to the 9-switch converter topology of the converter circuits of FIGS. 2 and 3, the output power factor angle can be derived from equation (11) and (14) as $$-\frac{\pi}{6} \leq \varphi_o \leq \frac{\pi}{6} \text{ or } \cos\varphi_o \leq 0.866 \qquad (15)$$

This is strict limitation for the 9-switch topology if there are no additional circuits in the DC link to provide paths for the negative current. Consequently, the application of this topology is somewhat limited; without the clamp circuit 38, for instance, it cannot serve as an induction motor drive. A clamp circuit as shown in FIG. 2 with only one capacitor and one diode will limit voltage spikes across the DC link lines. One limitation of this circuit is that it only allows power flow from the DC link to the clamp circuit. When the output power factor is lower than 0.866, current flows into this clamp capacitor continuously to continuously increase the capacitor voltage. If this voltage is too high, some of the components may be damaged.

The clamp circuit of FIG. 3 utilizes the switch 56 to allow exchange of power between the clamp capacitor and the converter. The operation of this circuit is discussed below:

When the converter is started, all of the switches in the line side converter 21 turn on initially and the clamp capacitor voltage is charged up to the maximum peak line voltage.

Under a fault state, all switches in the converter 20 are turned off immediately. The energy stored in the inductive load flows into the clamp capacitor 56 to avoid high voltage spikes.

During normal operation, if the clamp voltage $V_{cl}$ is higher than the threshold voltage $V_{th}$, the clamp switch Sc is turned on. Then the line-side converter is anti-biased because the threshold voltage is higher than the maximum amplitude of the input line voltage. In this condition, the voltage of the clamp capacitor begins to reduce because it provides power for the load. FIG. 7 shows the equivalent circuit of the converter when Sc is turned on.

During normal operation, if the clamp voltage $V_{cl}$ is lower than the threshold voltage, the clamp switch Sc is turned off. The line-side switches start to operate again. FIG. 6 shows the equivalent circuit of the converter when Sc is turned on.

From the analysis, it can be found the converter can operate safely when the output power factor is lower than 0.866. However, since the space vector PWM is not applicable in this condition, some low order harmonics will be generated when the output power factor is lower than 0.866.

Figure 11:
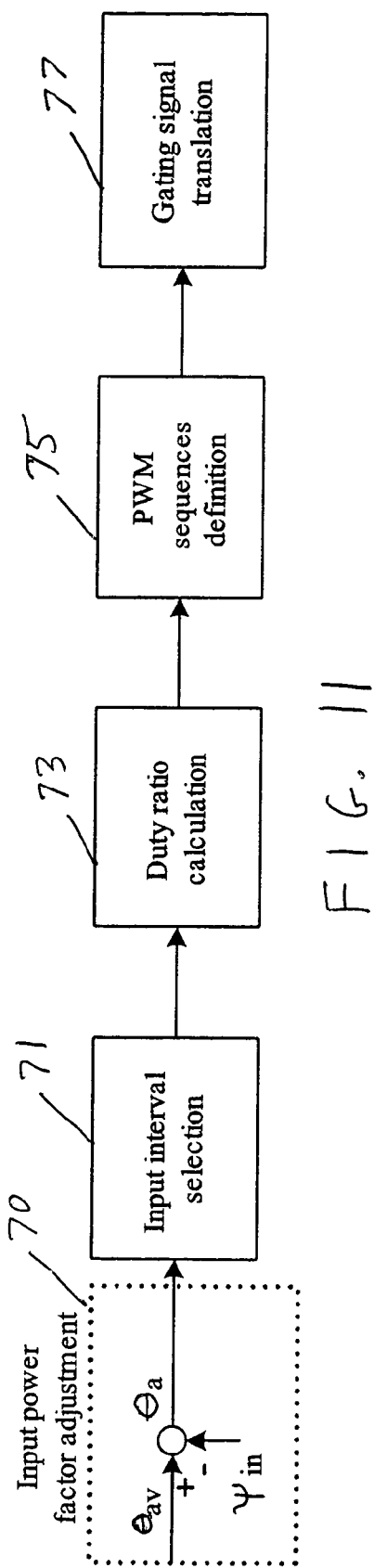
FIG. 11 is a flow diagram illustrating the process for carrying out the space vector PWM control for the converter of the invention.

FIG. 11 illustrates the steps carried out by the controller 40 in determining the PWM control signals. An input power factor adjustment is carried out initially, as indicated at 70 in FIG. 11, by subtracting the input phase shift angle $\psi_{in}$ from the input phase A angle $\theta_{av}$ to determine the angle of the line-side converter $\theta_a$. In this case, $-\pi/6 < \psi_{in} < \pi/6$. With the value of the angle of the line-side converter determined, an input interval selection can be carried out at 71 to determine the input interval, and each switching cycle can be divided into two portions. In each portion, the DC side voltage equals one of the three positive line-to-line voltages. Table 1 below shows the interval values and the $V_{dc}$ value under all conditions.

TABLE 1

Line side switch state and the DC side voltage in each interval.

| θa | | Portion 1 | | | Portion 2 | | |
|---|---|---|---|---|---|---|---|
| [−π/6, 11π/6] | Interval Number | On Switch | $V_{pn}$ | Duty ratio | On Switch | $V_{pn}$ | Duty ratio |
| [−π/6, π/6] | 1 | $S_{bm}, S_{am}$ | $V_{sab}$ | $d_{ab}$ | $S_{am}, S_{cm}$ | $V_{sac}$ | $d_{ac}$ |
| [π/6, 3π/6] | 2 | $S_{bm}, S_{cm}$ | $V_{sbc}$ | $d_{bc}$ | $S_{am}, S_{cm}$ | $V_{sac}$ | $d_{ac}$ |
| [3π/6, 5π/6] | 3 | $S_{bm}, S_{cm}$ | $V_{sbc}$ | $d_{bc}$ | $S_{am}, S_{bm}$ | $V_{sba}$ | $d_{ba}$ |
| [5π/6, 7π/6] | 4 | $S_{am}, S_{cm}$ | $V_{sca}$ | $d_{cc}$ | $S_{am}, S_{bm}$ | $V_{sba}$ | $d_{ba}$ |
| [7π/6, 9π/6] | 5 | $S_{am}, S_{cm}$ | $V_{sca}$ | $d_{ca}$ | $S_{bm}, S_{cm}$ | $V_{scb}$ | $d_{cb}$ |
| [9π/6, 11π/6] | 6 | $S_{am}, S_{bm}$ | $V_{sab}$ | $d_{ab}$ | $S_{bm}, S_{cm}$ | $V_{scb}$ | $d_{cb}$ |

Figure 12:
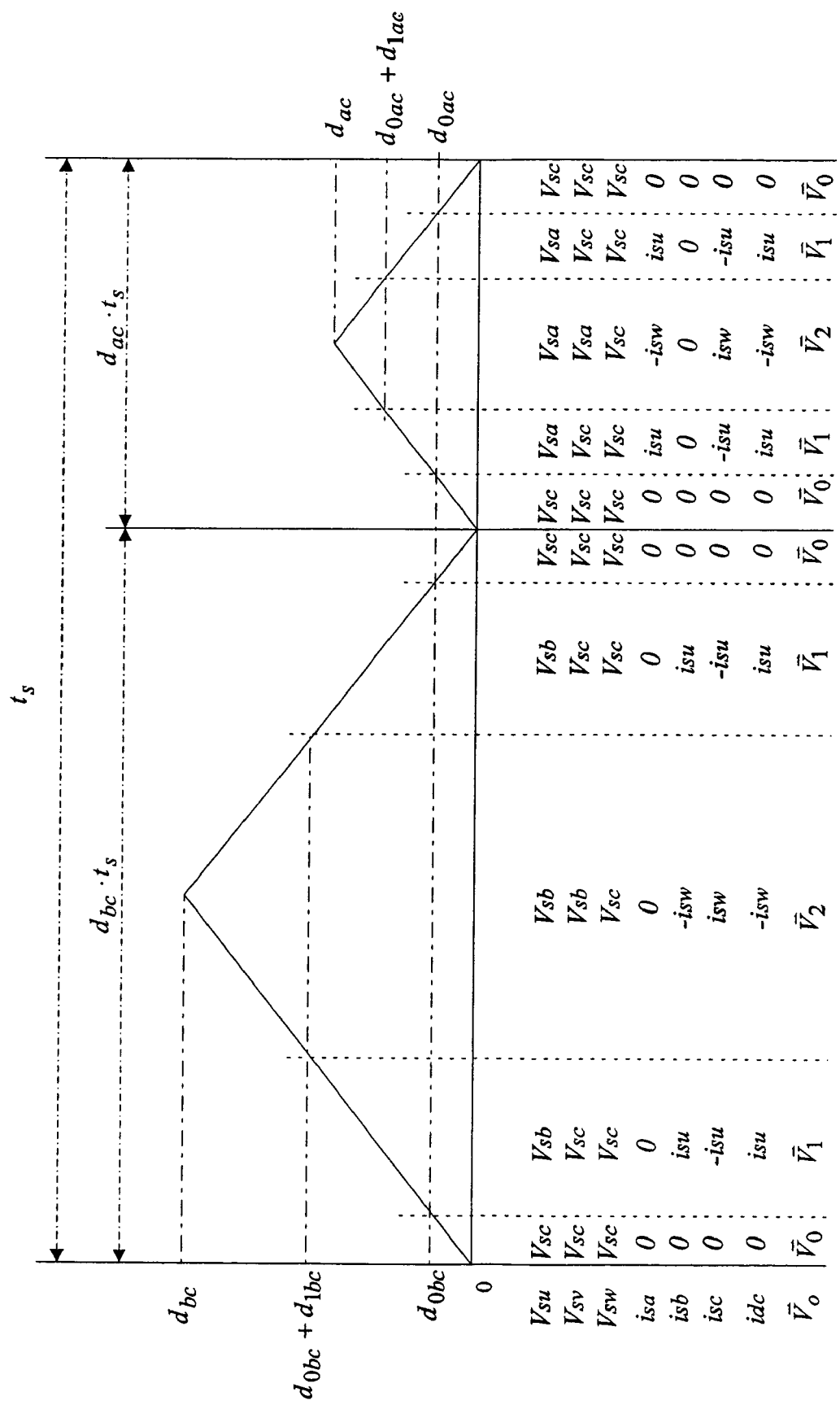
FIG. 12 is a graph illustrating the PWM sequences in one switching cycle in interval two.

The duty ratio calculations are then carried out at 73 for each space vector, and the PWM sequences are determined at 75. FIG. 12 shows the PWM sequences in interval two while $0 < \theta_a < \pi/6$. Similar sequences are determined for the other conditions. The gating signals are obtained at 77 utilizing the controller digital processing circuitry.

It is understood that the invention is not confined to the particular embodiments set forth herein as illustrative, but embraces all such forms thereof as come within the scope of the following claims.

What is claimed is:

1. A dual bridge matrix converter comprising:
  (a) a high DC link line and a low DC link line;
  (b) a line-side converter having three input lines connectable to a three-phase AC power system to receive AC power therefrom and connected to the DC link high and low lines to provide unidirectional power thereto, the line-side converter including three gate controlled switching devices, each gate controlled switching device connected from each side thereof by anti-parallel oriented diodes to one of the input lines and each switching device connected by a diode to the DC link high line and by a diode to the DC link low line;
  (c) a load-side converter connected to receive power from the DC link lines and having three output lines on which three-phase power is provided, the load-side converter comprising gate controlled switching devices connected in a bridge configuration with pairs of the switching devices connected between the DC link high line and low line and with junctions between the pairs of switching devices connected to the output lines;
  (d) a controller connectable to receive the AC voltages provided to the line-side converter and providing control signals to switch the switching devices of the line-side converter and the load-side converter with pulse width modulated control for AC output voltages on the output lines of the load-side converter; and
  (e) a clamp circuit connected between the DC link high line and the DC link low line, the clamp circuit including a series connected diode and capacitor with the diode arranged to conduct current from the high DC link line to the low DC link line.

2. The converter of claim 1 wherein the clamp circuit further includes a gate controlled switch connected in parallel with the clamp diode.

3. The converter of claim 2 wherein the gate controlled switch connected in parallel with the clamp diode is an IGBT connected so as to conduct when turned on in anti-parallel to the clamp diode.

4. The converter of claim 2 wherein the controller provides gate control signals to a gate of the switch connected in parallel with the clamp diode to turn the switch on to conduct when the voltage across the clamp capacitor is above a threshold voltage that is greater than the normal peak-to-peak voltage across the input lines and to turn off the switch to a non-conducting state when the voltage across the clamp capacitor is lower than the threshold voltage.

5. The converter of claim 1 further including an input filter connected between the AC power system and the input lines of the line-side converter, the input filter comprising series connected inductors and parallel connected capacitors.

6. A converter comprising:
  (a) a DC link high line and a DC link low line;
  (b) a line-side converter having input lines connectable to an AC power system to receive AC power therefrom and connected to the DC link lines to provide unidirectional power thereto, the line-side converter including multiple gate controlled switching devices and diodes connected between the input lines and the DC link high and low lines to provide controlled unidirectional power from the input lines to the DC link lines;
  (c) a load-side converter connected to receive power from the DC link lines and having output lines on which AC power is provided, the load-side converter comprising multiple gate controlled switching devices connected in a bridge configuration between the DC link lines and the output lines and controllable to provide AC power on the output lines;
  (d) a clamp circuit connected between the DC link high line and the DC link low line, the clamp circuit including a series connected diode and capacitor with the diode arranged to conduct current from the DC link high line to the DC link low line and to block current in the other direction, and a gate controllable clamp switch connected in parallel with the clamp diode; and
  (e) a controller providing a control signal to the clamp switch to turn the clamp switch on to conduct current from the clamp capacitor to the DC link high line when the voltage across the clamp capacitor is above a threshold voltage that is greater than the normal peak-to-peak voltage across the input lines and to turn off the clamp switch when the voltage across the clamp capacitor is lower than the threshold voltage.

7. The converter of claim 6 further including a controller connectable to receive the AC voltages provided to the line-side converter and providing control signals to switch the switching devices of the line-side converter and the load-side converter with pulse width modulated control for AC output voltages on the output lines of the load-side converter.

8. The converter of claim 7 wherein the controller that provides control signals to the switching devices of the line-side converter and the load-side converter also comprises the controller that provides control signals to the gate of the clamp switch.

9. The converter of claim 6 wherein the gate controlled switch connected in parallel with the clamp diode comprises an IGBT connected to conduct current when turned on in a direction anti-parallel to the direction of conduction of the clamp diode.

10. The converter of claim 6 wherein the line-side converter has three input lines to receive three-phase AC power from a three-phase AC power system, and wherein the load-side converter has three output lines to provide three-phase AC power.

11. A method of controlling a dual bridge matrix converter of the type having a DC link high line and a DC link low line, an input-side converter connected to receive AC input power and connected to provide unidirectional power to the DC link lines and having controllable switching devices to control the unidirectional power supplied to the DC link lines, and a load-side converter connected to the DC link lines to receive power therefrom and having output lines on which AC output power is provided, the method comprising:

(a) providing a clamp circuit across the DC link lines having a series connected diode and a capacitor, and a controllable switch connected in parallel with the clamp diode;

(b) when the voltage across the clamp capacitor is above a threshold that is higher than a normal peak-to-peak AC input voltage, turning on the clamp switch to discharge the clamp capacitor and conduct current through the switch to the load-side converter; and (c) when the voltage across the clamp capacitor is below the threshold voltage, turning off the clamp switch and maintaining the clamp switch off as long as the voltage across the clamp capacitor is less than the threshold voltage.

* * * * *